United States Patent [19]

Belmares-Sarabia et al.

[11] Patent Number: 4,857,994
[45] Date of Patent: Aug. 15, 1989

[54] COLOR CORRECTION SYSTEM AND METHOD

[75] Inventors: Armand Belmares-Sarabia, Catskill, N.Y.; Stanley J. Chayka, Parsippany, N.J.

[73] Assignee: Corporate Communications Consultants, Inc., Fairfield, N.J.

[21] Appl. No.: 150,626

[22] Filed: Feb. 1, 1988

Related U.S. Application Data

[60] Division of Ser. No. 943,298, Dec. 17, 1986, Pat. No. 4,763,186, which is a continuation-in-part of Ser. No. 598,468, Apr. 9, 1984, Pat. No. 4,679,067, and a continuation-in-part of Ser. No. 851,164, Apr. 14, 1986, abandoned.

[51] Int. Cl.[4] .............................................. H04N 9/74
[52] U.S. Cl. ........................................ 358/22; 358/80
[58] Field of Search ............................ 358/22, 80, 183

[56] References Cited

U.S. PATENT DOCUMENTS

| | | | |
|---|---|---|---|
| 4,172,264 | 10/1979 | Taylor et al. | 358/183 |
| 4,266,242 | 5/1981 | McCoy | 358/22 |
| 4,278,993 | 7/1981 | Suzuki | 358/22 |
| 4,302,776 | 11/1981 | Taylor et al. | 358/180 |
| 4,602,286 | 7/1986 | Kellar et al. | 358/22 |
| 4,612,569 | 9/1986 | Ichinose | 358/22 |
| 4,616,262 | 10/1986 | Toriumi et al. | 358/22 |
| 4,621,280 | 11/1986 | Shinohari et al. | 358/22 |
| 4,636,864 | 1/1987 | Annegarn et al. | 358/22 |
| 4,698,664 | 10/1987 | Nichols et al. | 358/22 |
| 4,712,130 | 12/1987 | Casey | 358/22 |
| 4,729,028 | 3/1988 | Micic et al. | 358/22 |
| 4,746,983 | 5/1988 | Hakamada | 358/183 |

*Primary Examiner*—John W. Shepperd
*Attorney, Agent, or Firm*—Gregor N. Neff

[57] ABSTRACT

Plural picture images are displayed side-by-side on a single display where they can be compared. It is preferred that the signals for the pictures be converted, by suitable processing means, into a form suitable for storage, and stored. The stored signals then are retrieved and displayed with a picture whose signals are processed by the same processing means so as to avoid differential degradation of the signals being compared. Preferably, the storage device is a digital memory and the processing means includes analog-to-digital and digital-to-analog conversion means. Color correction of one of the images can be affected, if needed, by the use of other features of the color corrector disclosed herein.

28 Claims, 7 Drawing Sheets

COLOR CORRECTION SYSTEM AND METHOD

This application is a division of application Ser. No. 943,298, filed on Dec. 17, 1986, now U.S. Pat. No. 4,763,186, issued Aug. 9, 1988. Application Ser. No. 943,298 was a continuation-in-part of U.S. patent application Ser. No. 598,468, filed on Apr. 9, 1984, which application issued as U.S. Pat. No. 4,679,067 on July 7, 1987; and a continuation-in-part of U.S. patent application Ser. No. 851,164, filed on Apr. 14, 1986, all of whose disclosures are hereby incorporated herein by reference.

BACKGROUND OF THE INVENTION

The invention relates to systems and methods for color correcting video picture signals. More particularly, the present invention pertains to improved systems and methods for increasing the quality and speed of color correction operations. This patent application describes improvements upon the color correction systems and methods disclosed in U.S. Pats. No. 4,096,523 (the "Rainbow" patent); No. 4,223,343 (the "Anamorphic" patent); No. 4,410,908 (the "Luminance" patent); copending, commonly owned U.S. patent applications Ser. No. 598,468, entitled "Color Correction System and Method With Localized Color Sampling"; Ser. No. 722,801, entitled "Color Correction System and Method with Scene-Change Detection"; and Serial No. 807,815, entitled "Editing System and Method, now U.S. Pat. No. 4,750,050, issued on June 7, 1988." Application Ser. No. 598,468 issued as U.S. Pat. No. 4,679,067 on July 7, 1987, while application Ser. No. 722,801 issued as U.S. Pat. No. 4,694,329 on Sept. 15, 1987. The disclosures of these patents and patent applications are hereby incorporated herein by reference.

There is a continuing need to improve the efficiency, speed, and quality of the color correction of video picture signals, especially in film-to-tape and tape-to-tape transfers, and particularly in scene-by-scene color correction.

OBJECTS OF THE INVENTION

Accordingly, an object of the invention is to satisfy the above needs and provide a system and method for color correcting video picture signals with increased efficiency, speed, and quality.

Another object of the invention is to provide an apparatus and a method for improving the accuracy with which a specific color or a specific range of colors may be color corrected.

An additional object of the invention is to provide an apparatus and a method for more easily identifying and recalling the color corrections associated with particular scenes in an image recording medium that is to be color corrected.

SUMMARY OF THE INVENTION

In accordance with the present invention, plural picture images are displayed on a single display where they can be compared. It is preferred that the signals for one of the pictures be converted, by suitable processing means, into a form suitable for storage, and stored. The stored signals then are retrieved and displayed with a picture whose signals are processed by the same processing means so as to avoid differential degradation of the signals being compared. Preferably, the storage device is a random-access digital memory. Also, the processing means includes analog-to-digital and digital-to-analog conversion means, if needed. Color correction of one of the images can be affected, if needed, by the use of the color corrector disclosed herein.

In accordance with a further aspect of the invention, the color corrections for a particular scene are identified or labeled with a video picture from that particular scene. The video picture is displayed for the operator, preferably on an auxiliary monitor screen, or on the main monitor screen. The operator may use the display to recall the color corrections for that particular scene and apply them to the video picture signals for the present scene. Several video pictures may be shown on the same display, and the operator may utilize an array of pushbuttons arranged like the video pictures on the screen or a light pen in order to choose the color corrections to be recalled.

Alternatively, the display may include a "touch screen," and the operator may touch the video picture associated with the desired color corrections in order to recall them. Numerical data giving locations of the corrections for prior scenes preferably are displayed next to the pictures on the auxiliary display. Thus, the operator also can use the numerical correction location information displayed next to each picture to retrieve the associated correction values. The operator does not have to remember the scene number for the particular scene, which may change as the motion picture film or the videotape is edited. This aspect of the invention enables the operator to readily identify, locate, and recall the color corrections he or she desires to work with. Therefore, this aspect of the invention greatly increases the speed with which a motion picture film or a videotape may be color corrected.

The features of the invention each increase the efficiency of the color correction process. In addition, when two or more features are used together, even greater efficiency results, such efficiency previously being unattainable.

BRIEF DESCRIPTION OF THE DRAWINGS

The above and other objects, features, and advantages of the present invention will become apparent upon consideration of the following detailed description of illustrative embodiments thereof, especially when taken in conjunction with the accompanying drawings, wherein:

FIGS. 5 and 7 through 15 and the accompanying description of application Ser. No. 943,298, filed Dec. 17, 1986, and in U.S. Pat. No. 4,763,186 issued Aug. 9, 1988 are not included here for the sake of brevity. However, the disclosure contained in those figures and description hereby are incorporated herein by reference.

FIGS. 16 and 17 are flowcharts of steps in computer programs that may be employed to implement the "Call-A-Picture" feature of the invention.

DETAILED DESCRIPTION OF THE PREFERRED EMBODIMENTS

General Description

Figure 1:
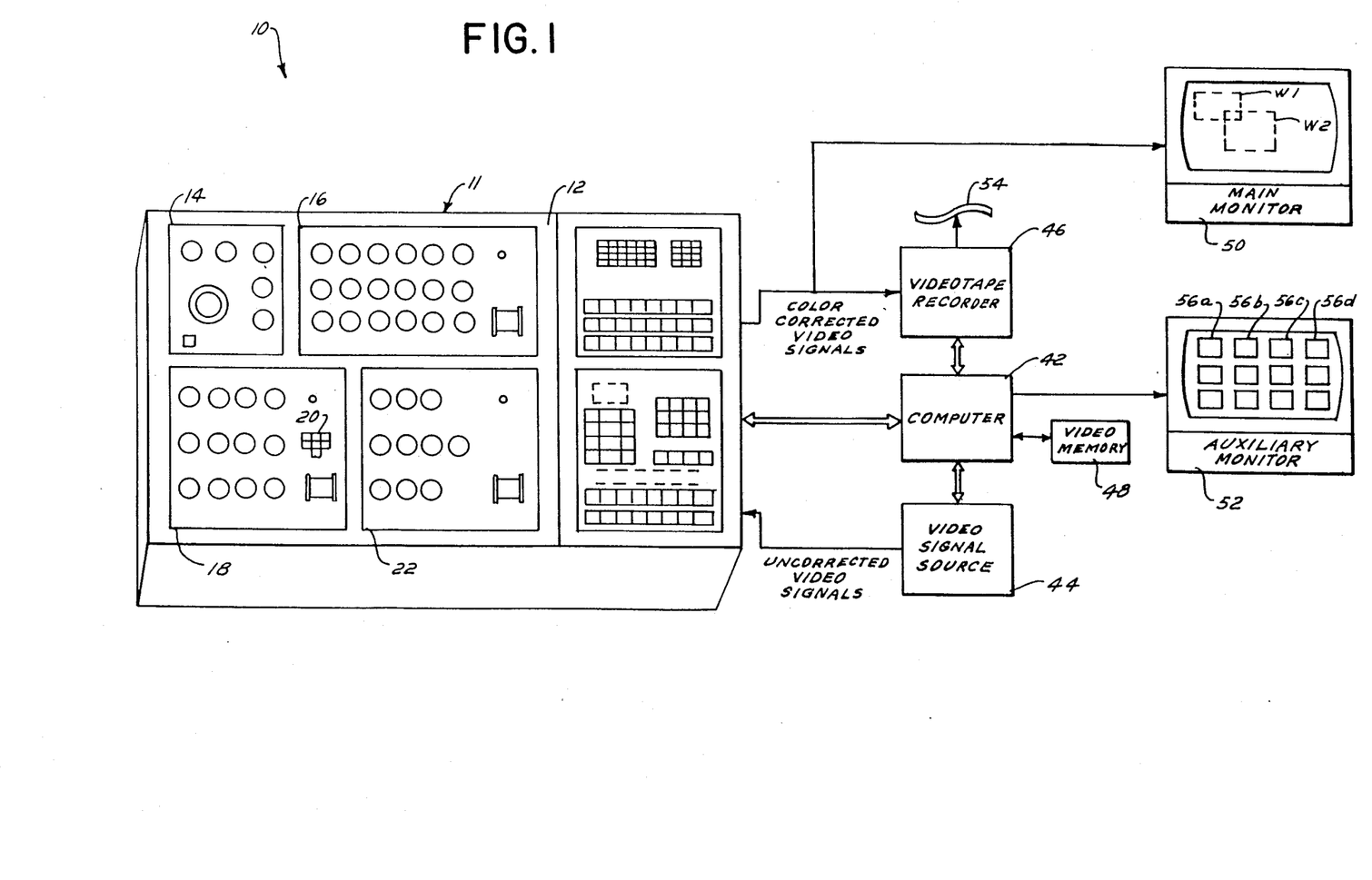
FIG. 1 is a diagrammatic illustration of a color correction system according to the invention.

FIG. 1 shows a color correction system 10 constructed according to the invention. The color correction system 10 includes a color corrector 11 having a front panel 12. Portions of the front panel 12 are illustrated in greater detail in FIGS. 2-4. The front panel 12 has a set of variable vector controls 14 and a set of six vector controls 16. The six vector controls 16 function as outlined in the Rainbow and Luminance patents.

Figure 2:
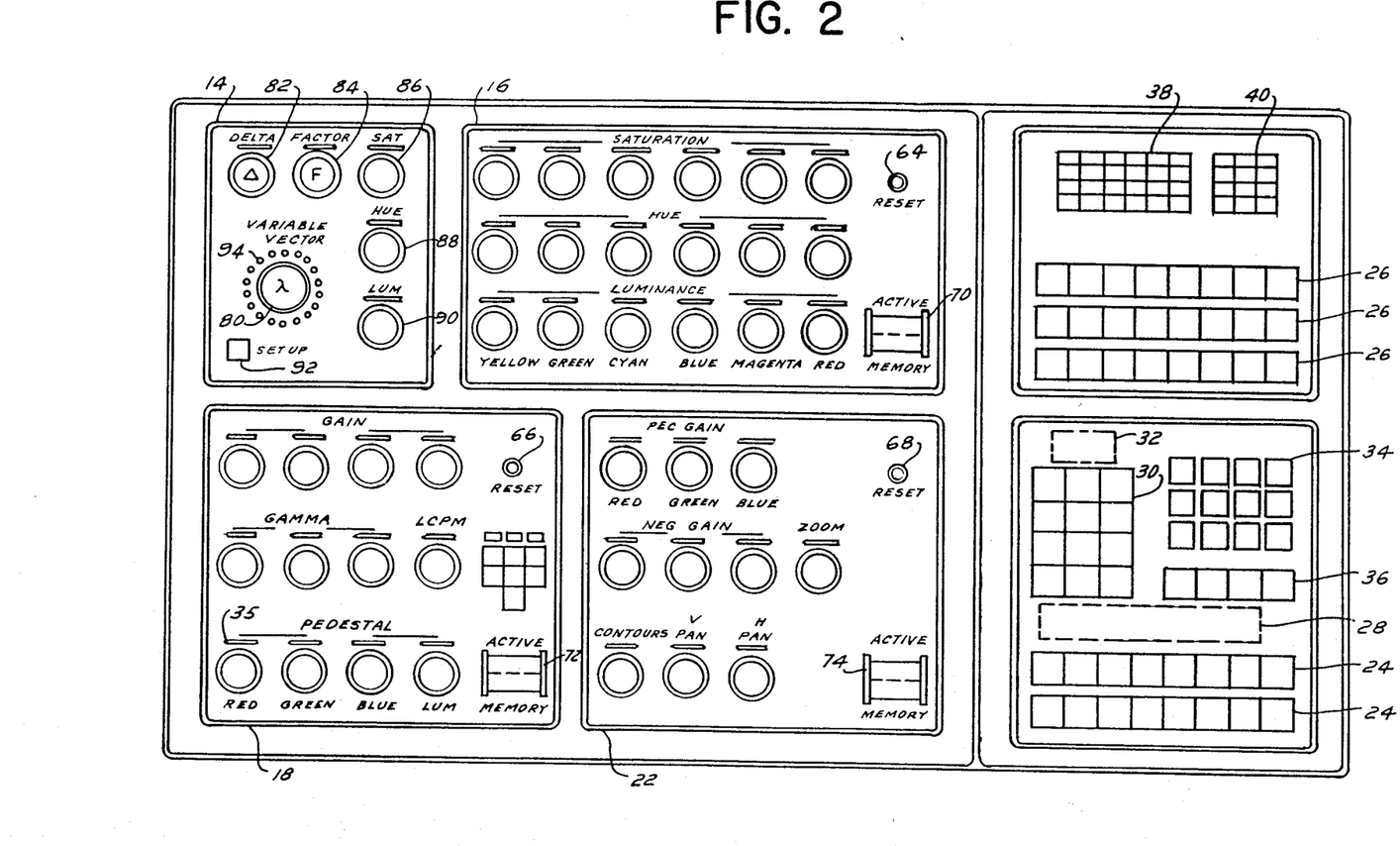
FIG. 2 is a top plan view of the front panel for the color corrector shown in FIG. 1.

Referring now to the lower left-hand portion of FIG. 2, the front panel 12 includes a set of color balance controls 18 and "window" controls 20. The "window" controls 20 are described and depicted in greater detail in U.S. Pat. No. 4,679,067 as well as U.S. Pat. No. 4,694,329. The front panel 12 additionally includes video signal source controls 22. The video signal source controls 22 adjust parameters such as the PEC gain and negative gain for each of the red, green, and blue channels. Moreover, the video signal source controls adjust other parameters, for instance, the horizontal pan, the vertical pan, the zoom, and the contours. Each of the controls in the sets of controls 14, 16, 18, and 22 includes a control knob which is coupled to a shaft-position encoder, as described in U.S. Pat. No. 4,679,067 and U.S. Pat. No. 4,694,329.

The right side of the front panel 12 includes pushbuttons and displays. Specifically, this portion of the front panel includes two rows of pushbuttons 24, which are shown in greater detail in FIG. 4, and three rows of pushbuttons 26, which are shown in greater detail in FIG. 3. The functions of many of these pushbuttons are described in the Rainbow and Luminance patents. A display 28 (FIG. 4) shows the scene number for the color corrections stored in the A buffer and the B buffer. Moreover, the display 28 shows the scene number for the current scene.

Figure 4:
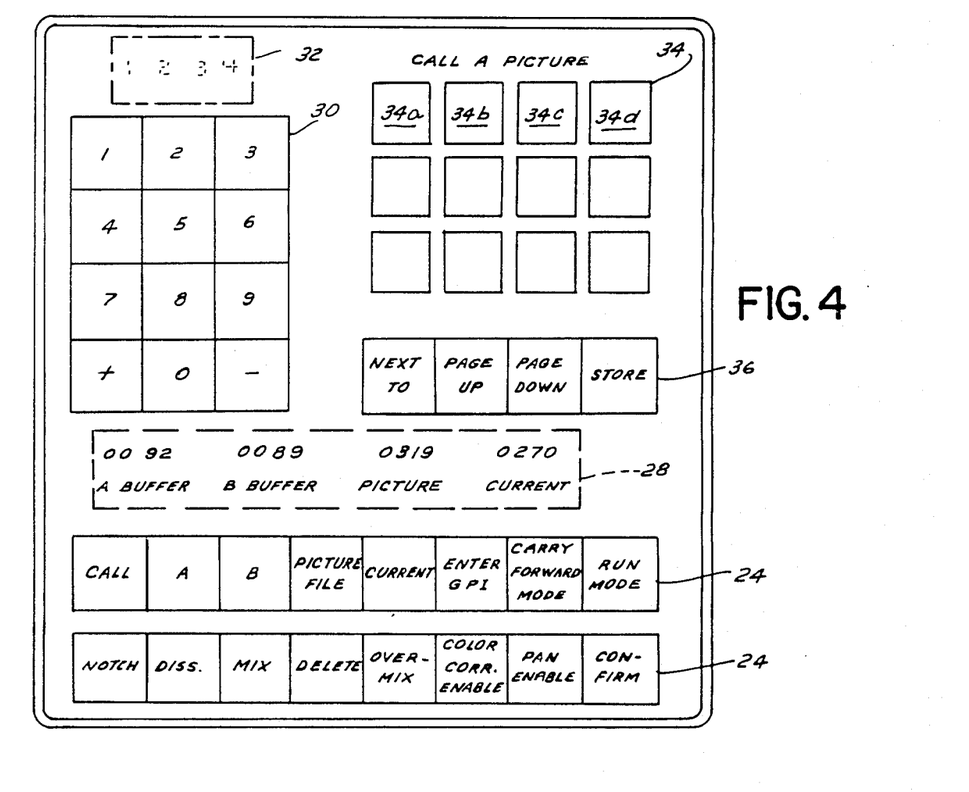
FIG. 4 is an enlarged view of another portion of the front panel shown in FIG. 2.

Still referring to FIG. 4, a keypad 30 and a display 32 are used to recall the color corrections for a particular scene and apply them to the present scene. For example, if the operator wanted to use the color corrections for scene number 1,234 for the current scene, the operator would press the "call" pushbutton in the upper one of the rows 24 and then the buttons 1, 2, 3, and 4 of the keypad 30 in this sequence in order to recall the desired color corrections.

Also shown in FIG. 4 is an array 34 of pushbuttons and a row of pushbuttons 36 for use in the "Call-A-Picture" feature of the invention, which feature is used for recalling color correction signals for previous scenes in another manner. The operation of the "Call-A-Picture" feature will be described in detail below. The portion of the front panel 12 shown in FIG. 3 has waveform pushbuttons and indicators 38 for selecting various waveforms for viewing on an oscilloscope (not shown) as well as monitor selector pushbuttons and indicators 40 for selecting various signals for monitoring.

Referring again to FIG. 1, the system 10 has a computer 42, which is connected to each of the color corrector 11, a video signal source 44, a videotape recorder 46, and a video memory 48. The video signal source 44 may be a film chain or telecine, a videotape player, or the like. The video signal source 44 produces video signals from the associated image recording medium. These video signals are delivered to the color corrector 11 so that they can be corrected. The color corrector 11 provides color corrections for the video signals from the video signal source 44 under the direction of the operator and the computer 42, and it produces color corrected video signals. The color corrected video signals are sent to a main monitor 50, and, at the appropriate time, to the videotape recorder 46. The operator may observe the effect of the color corrections on the video signals by looking at the video picture on the main monitor 50. The videotape recorder 46 records the color corrected video signals on a videotape 54, usually during a second run after color corrections have been made during a first run, thereby producing a color corrected videotape.

The main monitor is shown with windows W1 and W2. The use of the windows W1 and W2, which are movable in size and/or position, is described further below.

An auxiliary monitor 52 is connected to the computer 42. The auxiliary monitor 52 displays a plurality of video pictures, such as the video pictures 56a-56d. The function of the auxiliary monitor 52 and the video memory 48 is described below during the discussion of the "Call-A-Picture" feature.

Referring now to FIG. 2, above each of the control knobs in the sets of controls 14, 16, 18, and 22 is a horizontal linear group 35 of four light-emitting diodes ("LEDs"), which are referred to as "rangefinder" LEDs. The two inner LEDs of each group 35 are green, while the two outer LEDs are red. When the associated control knob is in its center position, the two inner LEDs are energized. If the control knob is turned to the right, the two inner LEDs are deenergized and the rightmost LED is energized. Correspondingly, if the control knob is turned to the left, the two inner LEDs are deenergized, and the leftmost LED is energized. Accordingly, the operator may quickly determine the position of any of the control knobs.

Reset buttons 64, 66, and 68, are provided to permit the operator to readily center the control knobs in the sets of controls 16, 18, and 22, respectively. Specifically, the operator presses a reset button, and all of the control knobs in the associated set of controls are electronically centered by zeroing the counter connected to the control knob. The controls 16, 18, and 22 include active memory pushbutton-indicators 70, 72, and 74, respectively.

Referring now to the lower part of FIG. 4, the "notch" pushbutton sets the scene boundary between scenes; that is, pressing the "notch" button stores the frame number of the first frame of a new scene. The "color correct enable" pushbutton in the same row makes the "notch" pushbutton effective for color correction events. The "pan enable" pushbutton makes the "notch" pushbutton effective for position related events, such as horizontal pans, vertical pans, and zooms.

The "carry forward mode" is entered by pressing the "carry forward mode" pushbutton in the upper row 24. In this mode, the color corrections from the last scene are carried forward for the next scene. That is, once the operator establishes color corrections for a particular scene and then sets the scene boundary between that scene and the next scene, these color corrections are both stored for the particular scene and applied to the next scene. Thus, the operator may use these color corrections as a basis for color correcting the next scene.

The "picture file" pushbutton is used with the video scene recall feature, i.e., the "Call-A-Picture" feature of the invention, which is described below. The "picture file" pushbutton enables the array of pushbuttons 34 and the row of pushbuttons 36.

The "diss." pushbutton is used to produce a linear transition between the color corrections for a given scene and the color corrections for the subsequent scene. For example, the operator may make color corrections for a given scene and then make color corrections for the subsequent scene. If the operator wants a smooth transition between scenes, the operator presses the "dissolve" pushbutton at a frame near the end of the given scene and again presses the "dissolve" pushbutton at a frame near the beginning of the subsequent scene. The computer is programmed to automatically provide a linear transition, for instance, on a frame-by-frame basis, between the color corrections for the given scene and the color corrections for the subsequent scene for all frames between the two dissolve points.

Figure 3:
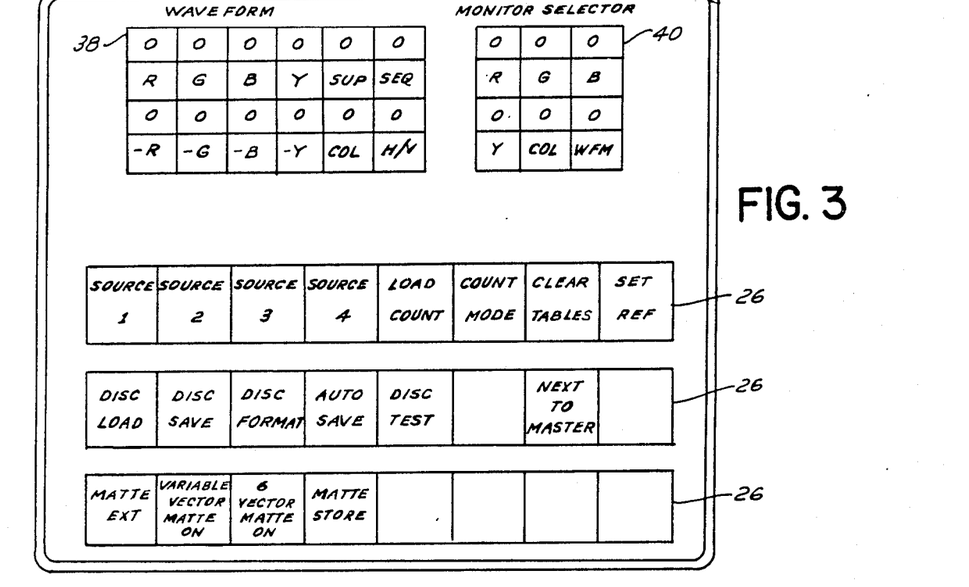
FIG. 3 is an enlarged view of a portion of the front panel shown in FIG. 2.

The "source 1," "source 2," "source 3," and "source 4" pushbuttons, which are shown in row 26a of FIG. 3, enable the operator to select one of a variety of video signal sources. For example, the operator may select a telecine as the video signal source by pressing the "source 1" pushbutton, or select a videotape player as the video signal source by pressing the "source 2" pushbutton.

The "load count" pushbutton (next to the "source 4" button) allows the frame counter to be initialized to any number at the beginning of a new job. The "count mode" pushbutton allows the operator to select among various counting modes for the frame counter, such as, counts by hours, minutes, seconds and film frames; or PAL video frames; or NTCS video frames.

The "matte ext," "variable vector matte on," "six vector matte on," and "matte store" pushbuttons are described below during the description of the "Traveling Matte" feature of the invention.

The "disc load," "disc save," "disc format," "auto save," and "disc test" pushbuttons are utilized to control an external storage device (not shown) for the computer, such as a floppy disc drive or a hard disc drive.

VARIABLE VECTOR CONTROLS

The upper left-hand portion of FIG. 2 illustrates the set of variable vector controls 14. The controls 14 include a variable vector position control 80, a delta control 82, a factor control 84, a saturation control 86, a hue control 88, and a luminance control 90. Furthermore, the variable vector controls 14 include a "set up" pushbutton 92, the function of which is described below. A ring of LEDs 94 is located around the circumference of the variable vector position control 80. The LEDs 94 indicate the angular orientation of the variable vector position control 80. The angular orientation of the variable vector position control 80 corresponds to one of the colors on a vectorscope.

The variable vector position control 80 is used to select a particular range of colors for color correction. The principal color within the range of colors is determined by the angular orientation of the variable vector position control 80. The variable vector position control 80 may be used to select any principal color within the precision of the associated counter. For example, if the associated counter is a 12-bit counter, any one of 4,096 different principal colors may be selected with the variable vector position control 80. Thus, the principal color is essentially infinitely variable.

The luminance control 90 may be used to increase or decrease the brightness of the colors within the selected range of colors. Of course, the luminance control 90, the hue control 88, and the saturation control 86 may be employed together to alter the associated parameters of the colors within the selected range of colors. The variable vector control knob 80 and the delta control knob 82 are utilized to set the selected range of colors, as noted above. The factor control 84 is used to select those colors within the selected range of colors that have saturation levels either above or below a specified level. The function of the factor control 84 is described in greater detail below during the description of FIGS. 10 and 11.

As an example of the use of the variable vector controls 14, the color correction of a particular scene will be described. Assume the operator desires to color correct a specific object, such as an apple appearing in a picture on the main monitor 50. The operator initially presses the "set up" pushbutton 92, which is part of the variable vector controls 14. This causes all portions of the picture which have colors within the nominal range of colors set by the variable vector position control 80 to become a neutral gray. If the apple does not become gray, the operator rotates the variable vector position control 80 until the apple becomes gray. If only a portion of the apple becomes gray because the apple contains colors outside of the selected range, the operator rotates the delta control to increase the delta or bandwidth of the selected range until the entire apple becomes gray. This signifies that the colors the operator desires to correct, i.e., the colors forming the apple, are encompassed within the selected range. The operator again presses the "set up" pushbutton 92, and the colors are displayed in an unaltered fashion.

Alternatively, the "set up" button may be connected so that objects with the selected color appear normally on the monitor while objects having other colors appear to be gray. The modifications to FIG. 7A that are necessary to implement this feature are readily apparent to a person having ordinary skill in the art and, therefore, will not be described in detail here.

Now, the operator may turn any or all of the saturation control 86, the hue control 88, or the luminance control 90 in order to adjust the corresponding parameter of the colors within the selected range of colors. For instance, the operator may rotate the hue control 88 to change the color of the apple from a greenish red to red. Once the operator has developed the color corrections with the controls 86, 88, and 90, the operator causes the color corrections to be stored in the computer 42. The storage and retrieval of the color corrections may be accomplished as described in the Rainbow patent. The color corrections are read from the memory in the computer and used to produce the color corrected videotape 54 during the "run" mode.

In this manner, the video picture signals forming the apple may be color corrected to produce a desirable image. With the variable vector controls, the apple may be segregated from any of the other objects in the picture and then color corrected. Accordingly, the variable vector controls permit greater object selectivity during color corrections and speed the color correction procedure. That is, an object can be segregated from others having hues very close to that of the selected object, or even from objects having the same hue but a different saturation level. It is believed that the hue of the selected object can be closer to that of other similarly colored objects and still be effectively segregated for color correction purposes than with prior color correction devices. This not only improves the speed of color correction, but makes some color corrections possible for the first time, thus significantly improving the color correction quality.

VIDEO SCENE RECALL ("CALL-A-PICTURE") FEATURE

Referring now to FIG. 4, pushbuttons 34 and 36, together with the auxiliary monitor 52 shown in FIG. 1, may be used to implement the video scene recall or "Call-A-Picture" feature of the invention. This feature gives a miniature reproduction on the monitor 52 of a frame from each of several prior scenes which have been color-corrected. This allows the operator to visually select the prior scene whose corrections are to be recalled without running the telecine or tape player backwards or using slow prior methods.

In the specific preferred embodiment shown in the drawings, the auxiliary monitor 52 displays up to twelve different video pictures, such as the video pictures 56a–56d shown in FIGS. 1 and 6. The twelve video pictures are displayed in an array with four columns and three rows. Each of the twelve video pictures corresponds to one of the twelve pushbuttons 34 shown in FIGS. 2 and 4. Each video picture is associated with the color corrections for the scene which includes that video picture, and each pushbutton 34 is associated with one of the video pictures. Specifically, the pushbuttons 34a–34d correspond to the video pictures 56a–56d, respectively. The pushbuttons correspond to the video pictures based upon their placement in the associated array.

When the operator desires to recall the color corrections for the scene with the video picture 56b, for example, the operator presses the pushbutton 34b, and those color corrections are recalled and applied to the output of the video signal source 44. The information for producing the video pictures on the auxiliary monitor is stored in the video memory 48. This information is recalled and directed to the auxiliary monitor under the control of the computer 42. The video memory 48 can be any commercially available video picture storage device. One such device which has been used successfully is the Model ICB Image Capture Board sold by AT&T, which is a digital device for storing and retrieving video picture signals.

The video scene recall feature of the invention enables the operator to quickly and easily determine and recall particularly useful color corrections. The operator does not have to remember what scene corresponds to the contents of buffer A or what scene corresponds to the contents of buffer B. Moreover, the operator does not have to think of a name for the color corrections for a given scene and type it onto a display or write it down somewhere. This feature of the invention presents the operator with an easily recognizable label for specific color corrections. Thus, the operator is better able to recall and utilize previous color corrections. As a result, the time necessary for color correcting a videotape is shortened. The video scene recall feature is an alternative to the use of the "call" pushbutton and the keyboard 30 for recalling previous color corrections.

FIGS. 6A–6C show the main monitor 50 and the auxiliary monitor 52 on a larger scale than in FIG. 1.

FIG. 6A illustrates the auxiliary monitor 52 after the operator has identified the color corrections for two previous scenes. The operator has used video pictures 56a and 56b for the identification of the color corrections. In particular, the operator has identified the color corrections for scene 0081 with a video picture corresponding to a person's face, and the operator has identified the color corrections for scene 0097 with a video picture corresponding to a house. A different video picture, i.e., a video picture from the current scene, is displayed on the main monitor 50 in the lower left hand corner of FIG. 6. The operator determines the color corrections for the current scene, as set forth above and in the Rainbow patent, and now wishes to identify those color corrections for later use. The operator simply presses the "store" pushbutton, which is located in the row of pushbuttons 36 (FIG. 4), and then the operator presses the pushbutton 34c.

FIG. 6B illustrates what happens after the operator presses these pushbuttons. The picture on the main monitor 50 is displayed on the auxiliary monitor as the video picture 56c, which corresponds to the pushbutton 34c, and the scene number for the present scene, i.e., 0110, is displayed in the auxiliary display below the video picture 56c. At any later time the operator may press the pushbutton 34c, and the color corrections for scene 0110 will be recalled and applied to the then current scene.

The operator is not required to use the video pictures on the auxiliary monitor 52 and the pushbuttons 34 to identify the color corrections in any specific order. For example, the operator could have pressed the button 34d in order to identify the color corrections for the current scene. If the operator had done so, the video picture of the dancer would have been displayed in location 56d instead of location 56c.

FIG. 6C depicts a variation of the video scene recall feature of the invention. If the operator wishes to compare the color corrections for two given scenes, the operator may press the "next to" pushbutton, which is located in the row of pushbuttons 36 in FIG. 4. As an example, assume that the operator has identified the color corrections for three scenes as shown by the auxiliary monitor 52 in FIG. 6B and that the operator has pressed the pushbutton 34b to apply the corresponding color corrections stored for scene 0097 to the current scene shown in the lower right hand portion of FIG. 6. Now, the operator desires to compare the effect of the color corrections for the current scene, i.e., scene 0115, with the effect of the color corrections for scene 0097. The operator simply presses the "next to" pushbutton. As it is shown in FIG. 6C, the picture of the dog on the main monitor 50 is then displayed next to the picture for scene 0097 on the auxiliary monitor, and the picture that was in location 56c is automatically moved to location 56d. Consequently, the operator may readily compare the color corrections for scene 0097 with the color corrections for scene 0115 on the auxiliary monitor 52. If the operator wishes to examine the color corrections for these two scenes on a larger scale, the operator may use the "next to master" pushbutton, which is shown in FIG. 3, thereby causing the two video pictures to be displayed simultaneously side-by-side on the master monitor 50.

Of course, either video picture can be shown alone on the master monitor 50. The ability to thus display a prior scene or frame on the master monitor 50 without running the telecine or tape player back saves wear and tear on the film or tape and minimizes damage due to scratching.

As a further variation, it should be understood that the identification frames of prior scenes can be selectively called up from the video memory and displayed on the master monitor 50 instead of the auxiliary monitor. The array of identification frames can be displayed in part of the screen while the current scene is displayed on the rest of the screen, or the full array of identification frames can be displayed by itself, as desired.

The video memory 48 contains sufficient storage for the twelve video pictures 56 on the auxiliary monitor 52. If the identification of color corrections for more than twelve scenes is desired, the video memory 48 may contain additional storage for the additional video pictures. That is, the video memory 48 may contain additional pages of memory. In order to move from one page of the video memory, with an associated display of up to twelve video pictures on the auxiliary monitor, to another page of video memory, with a different display of up to twelve video pictures on the auxiliary monitor, the "page up" and "page down" pushbuttons are employed. The "page up" and "page down" pushbuttons are located in the row of pushbuttons 36 in FIG. 4.

Figure 5A:
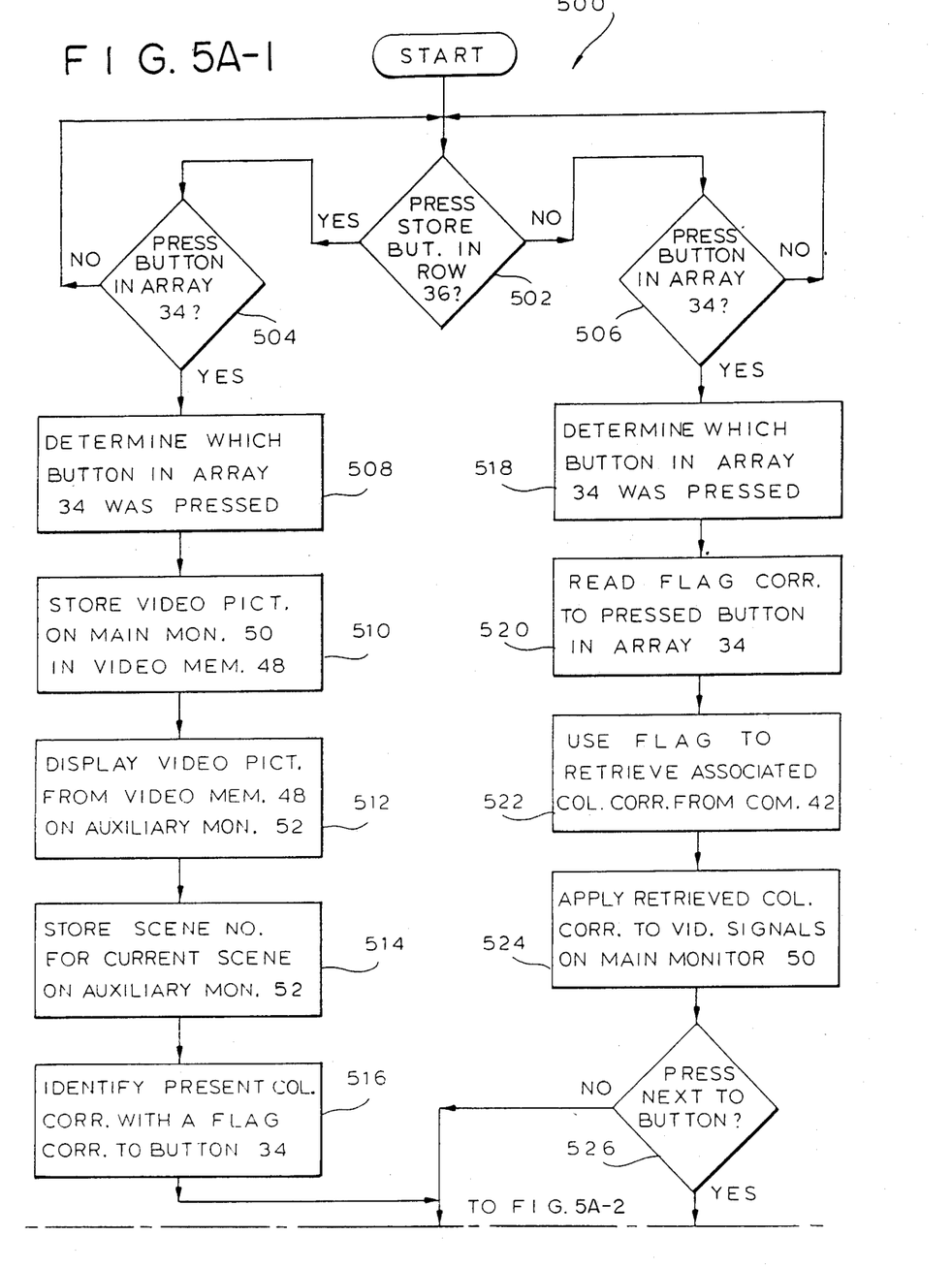
Figure 5A:
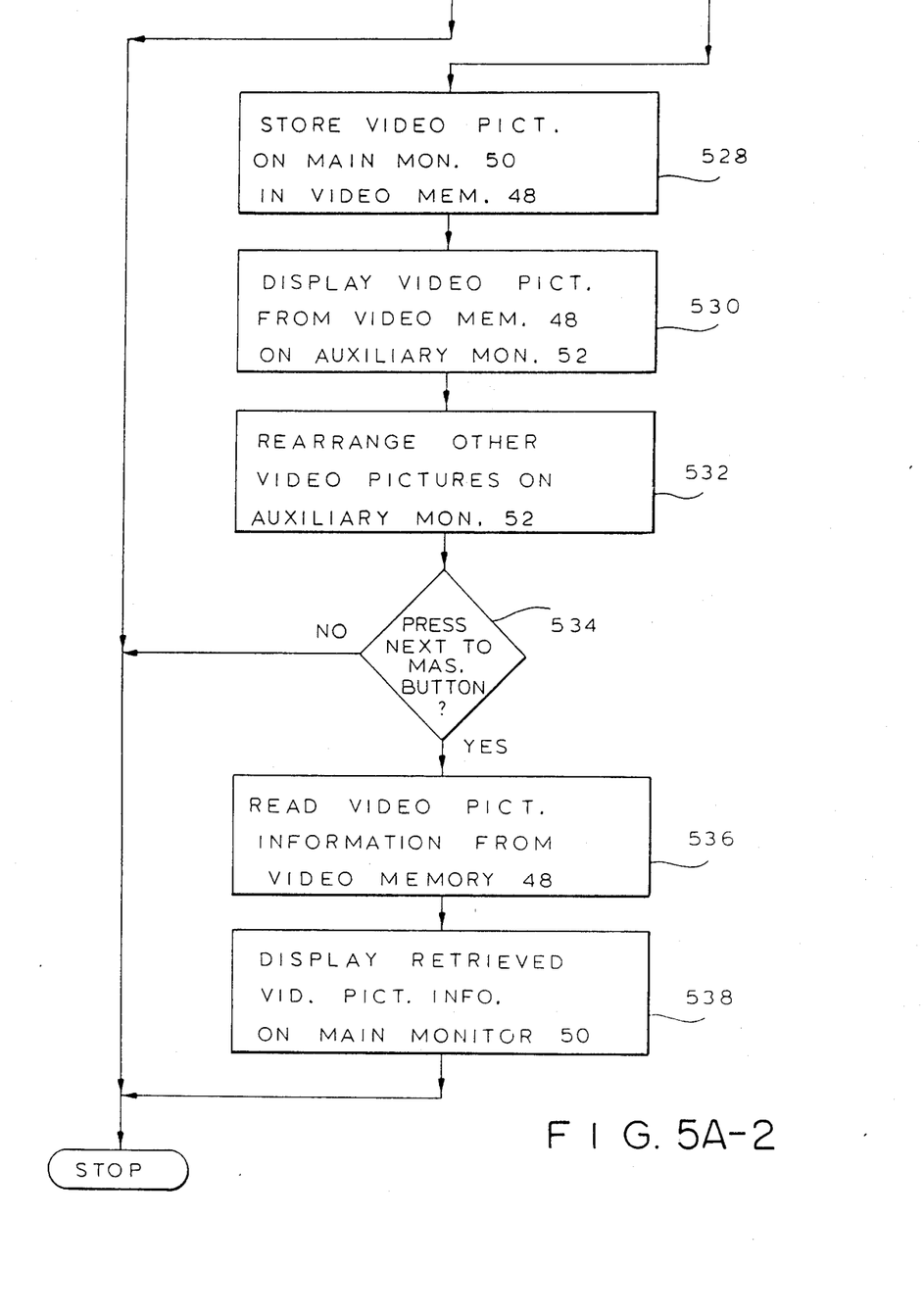
Figure 5B:
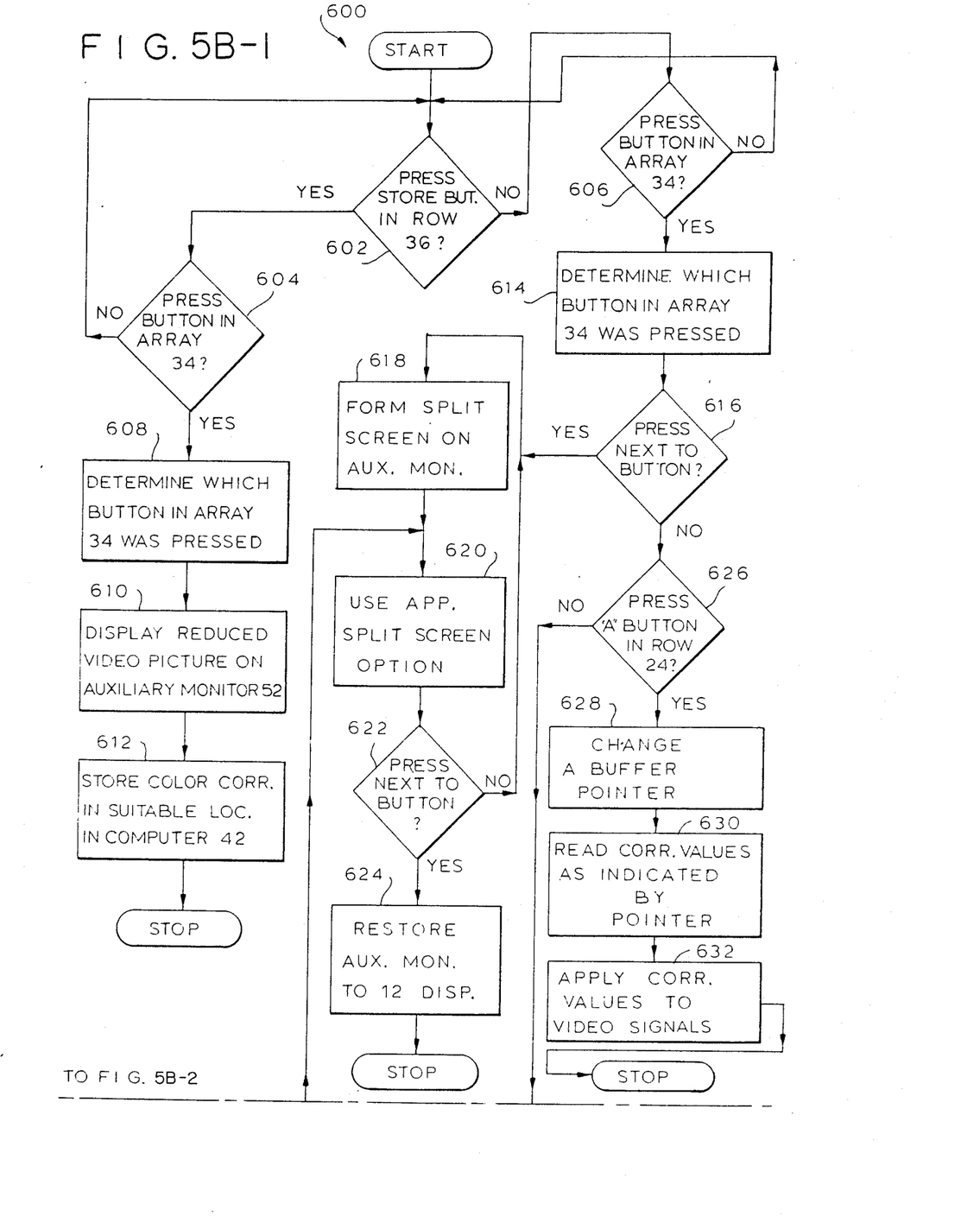
Figure 5B:
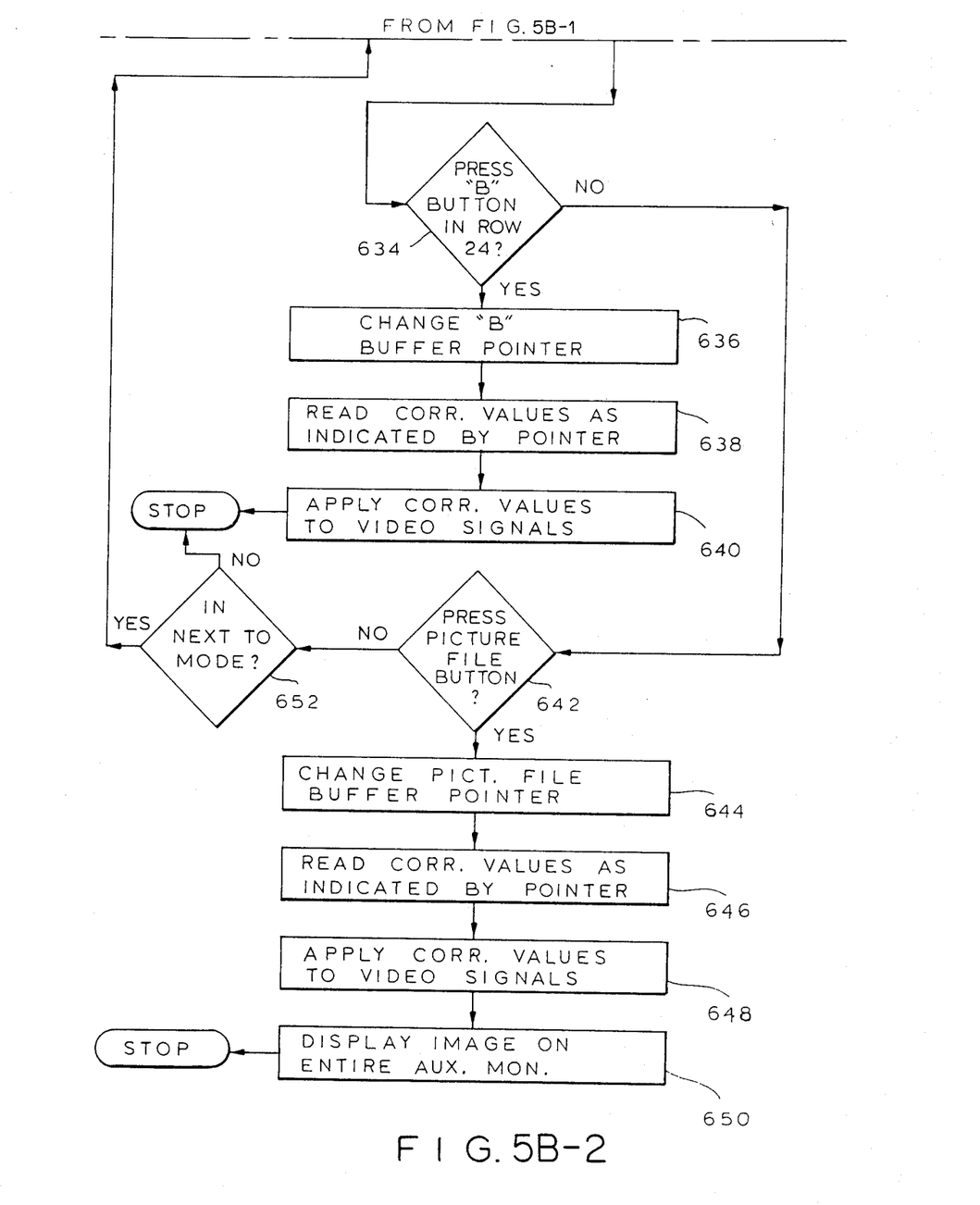

FIG. 5A of the drawings is a flowchart illustrating a computer program used to operate the "Call-A-Picture" feature of the invention. The routine is generally designated by the reference numeral 500.

Initially, the routine checks to ascertain whether the "store" button in the row 36 (FIGS. 2 and 4) has been pressed, as indicated at 502. If so, the routine then checks to determine whether a button in the array 34 of buttons has been pressed, as denoted at 504. However, if the "store" button in the row 36 has not been pressed, the routine simply inquires whether a button in the array 34 (FIGS. 2 and 4) has been actuated, as indicated at 506. The left branch of the flowchart in FIG. 5A, starting with the decision block 504, may be considered as a "write" mode since video picture information is stored during this mode. Correspondingly, the right branch of the flowchart in FIG. 5A, starting with the decision block 506, may be considered as a "read" mode since video picture information is recalled during this mode.

Once the "store" button (FIG. 4) and a button in the array 34 (FIG. 4) have been pressed, the routine determines specifically which button in the array 34 was actuated, as shown at 508. Then, the routine stores the video signals for the video picture appearing on the main monitor 50 (FIG. 1) in the video memory 48 (FIG. 1), as illustrated at 510. Subsequently, the routine displays a video picture from the video memory 48 (FIG. 1) on the auxiliary monitor 52 (FIG. 1) in the location 56 (FIGS. 1 and 6) corresponding to the button in the array 34 that was just actuated, as indicated at 512. In addition, the routine stores the scene number for the current scene on the auxiliary monitor 52 in the numerical display directly beneath the appropriate location 56, as depicted at 514.

Moreover, the routine identifies the color corrections for the current scene with a flag corresponding to the button in the array 34 that was just pressed, as shown at 516. This flag will be used during the "read" mode in order to access these color corrections and recall them from the computer 42 (FIG. 1). For example, a button in the array 34 of buttons may be identified with a flag through the use of a suitable subroutine. A person having ordinary skill in the art would understand that various techniques may be employed to accomplish this task. Consequently, such steps will not be discussed here in detail.

Referring now to the right branch of the routine illustrated in FIG. 5A, i.e., the steps used in the "read" mode, this mode is entered by simply pressing a button in the array 34 of buttons (FIGS. 2 and 4), as shown by the decision block 506. Once this mode has been entered, the routine determines specifically which button in the array 34 was actuated, as indicated at 518. The routine then reads the flag corresponding to the button that was just pressed, as illustrated at 520.

Next, the routine uses the flag to retrieve the associated color corrections from the computer 42 (FIG. 1), as depicted at 522. For instance, a suitable subroutine may be called and utilized to retrieve the color corrections for the previous scene from the computer 42. A person having ordinary skill in the art would understand that various techniques may be employed to accomplish this task. Accordingly, such steps will not be discussed here in detail.

After the color corrections for the previous scene have been retrieved from the computer 42 (FIG. 1), they are applied to the uncorrected video signals from the video signal source 44 (FIG. 1), as denoted at 524, to produce color corrected video signals. These color corrected video signals are delivered to the main monitor 50 (FIG. 1), which then displays a color corrected picture.

Referring again to the right branch of the routine shown in FIG. 16, the blocks below block 524 depict additional aspects of the "Call-A-Picture" feature of the invention.

Namely, the routine inquires whether the "next to" button in the row 36 of buttons (FIG. 4) has been pushed. If not, no further action is taken by the routine. However, if the "next to" button has been actuated, the routine stores the video signals for the video picture appearing on the main monitor 50 (FIG. 1) in the video memory 48 (FIG. 1), as designated at 528. The video picture on the main monitor 50 shows the effects of the recalled color corrections for the previous scene after they have been applied with or without modifications to the present scene. Specifically, the color corrections obtained through the steps shown by blocks 518, 520, 522, and 524 are applied to the video picture for the current scene, and then this color corrected video picture is stored in the video memory 48, as indicated at 528.

Subsequently, the routine displays the video picture that was just stored in the video memory 48 on the auxiliary monitor 52 (FIG. 1), as illustrated at 530. This video picture is displayed in a location 56 (FIGS. 1 and 6) that is adjacent to the location 56 corresponding to the button in the array 34 that was pressed to enter the "read" mode. The routine also rearranges the other video pictures on the auxiliary monitor 52, as shown at 532, if necessary, in order to properly position the miniaturized video picture for the present scene.

Blocks 534, 536, and 538 in FIG. 5A illustrate an additional aspect of the "Call-A-Picture" feature of the invention. Starting with the decision block 534 in the lower right-hand portion of FIG. 16, the routine ascertains whether the "next to master" button in the middle row 26 of buttons (FIG. 3) has been pushed. If not, the routine takes no further action. However, if the "next to master" button has been actuated, the routine reads the video picture information for two video pictures from the video memory 48 (FIG. 1), as indicated at 536. Namely, the video picture information for the picture that was stored during the steps designated by block 530 is read from the video memory 48, as is the video picture information for the location 56 corresponding to the button in the array 34 that was pressed to enter the "read" mode. The retrieved video picture information is displayed on the main monitor 50 (FIG. 1), as shown at 538. Accordingly, the operator may observe the effects of certain color corrections on both the present scene and a prior scene, and, as noted previously, these color corrections may be modified when they are applied to the present scene. This observation may be made on the main monitor 50 through the use of the "next to master" button in order to enable the operator to clearly view the two video pictures on an enlarged scale.

FIG. 5B of the drawings is a flowchart illustrating another computer program that may be used to operate the "Call-A-Picture" feature of the invention. The routine is generally designated by the reference numeral 600.

Initially, the routine checks to determine whether the "store" button in row 36 (FIGS. 2 and 4) has been pressed, as indicated at 602. If so, the routine then checks to determine whether a button in the array 34 of buttons (FIGS. 2 and 4) has been actuated, as denoted at 604. However, if the "store" button has not been pressed, the routine just inquires whether a button in the array 34 has been actuated, as indicated at 606. As in the flowchart of FIG. 16, the left branch of the flowchart of FIG. 5B may be considered as a "write" mode, while the right branch of the flowchart may be considered as a "read" mode.

After the "write" mode has been entered by pressing the "store" button and then by pressing one of the buttons in the array 34, the routine determines exactly which button in the array 34 was pressed, as denoted at 608. The routine next displays the video picture from the main monitor 50 (FIG. 1) in a reduced form on the auxiliary monitor 52 (FIG. 1), as shown at 610. The reduced video picture is displayed in the location corresponding to the button in the array 34 that was just actuated. The routine then stores the present color corrections in a suitable location in the memory of the computer 42 (FIG. 1), as illustrated at 612. Specifically, a number of memory locations in the computer 42 have been allocated for the miniaturized video pictures that may be displayed on the auxiliary monitor 52. The storage step shown at 612 causes the present color corrections to be stored in the memory location corresponding to the button in the array 34 that was just pressed. This storage step is the last task performed in the "write" mode.

Referring now to the right branch of the routine illustrated in FIG. 5B, i.e., to the steps used in the "read" mode, this mode is entered merely by pressing a button in the array 34 of buttons (FIGS. 2 and 4), as shown by the decision block 606. Once this mode has been entered, the routine determines exactly which button in the array 34 was pressed as denoted at 614.

The routine then inquires whether the "next to" button in the row 36 (FIG. 4) has been pushed, as denoted at 616. If so, the routine forms a split screen on the auxiliary monitor 52, as indicated at 618. Subsequently, the routine checks which of several split screen options has been selected by the operator and then uses the appropriate split screen option to divide the display on the auxiliary monitor 52, as indicated at 620. For example, the screen of the auxiliary monitor may be divided into left and right halves, or into top and bottom halves. Additionally, the screen may be divided into three sections, with one video picture appearing in the center section and another video picture appearing in the two sections bordering the center section. Furthermore, the dividing line between the two portions of the screen may be positioned as desired by the operator.

The routine then ascertains whether the "next to" button has again been pressed, as indicated at decision block 622. If not, the routine repeats the steps in blocks 618 and 620. If the "next to" button has again been pressed, the routine restores the normal twelve-picture display on the auxiliary monitor 52, as shown at 624.

Referring to the right branch of the flowchart of FIG. 5B, if the routine is in the "read" mode and the "next to" button has not been actuated, the routine inquires whether the "A" button or the "B" button or the "picture file" button in the upper row of buttons 24 (FIG. 4) has been pressed, as indicated by the decision blocks 626, 634, and 642.

When the "A" button is actuated during the "read" mode, the routine changes the pointer associated with the "A" buffer, as designated at 628. That is, the routine causes the pointer for the "A" buffer to assume a value corresponding to the memory location in the computer 42 associated with the button in the array 34 that was pressed to enter the "read" mode. Then, the routine uses the pointer to read the appropriate color corrections from the computer 42, as illustrated at 630. The routine next applies these recalled color corrections to the uncorrected video signals from the video signal source 44, as indicated at 632, to produce color corrected video signals, which are displayed on the main monitor 50.

If the "A" button has not been pressed during the "read" mode, the routine inquires whether the "B" button has been pressed, as denoted at 634. If so, the routine carries out substantially the same steps as shown in the blocks 628, 630, and 632, in the blocks 636, 638, and 640.

If the "A" button and the "B" button have not been pressed during the "read" mode, the routine determines whether the "picture file" button in the upper row of buttons 24 (FIG. 4) has been actuated. This step is illustrated by the decision block 642. The purpose of the "picture file" button is to cause the selected miniature video picture in the twelve-picture display to be displayed over the entire area of the auxiliary monitor. Accordingly, when the "picture file" button has been pressed during the "read" mode, the routine changes the pointer for the "picture file" buffer, as designated at 644. The steps used to carry out the function denoted at block 644 are essentially the same as the steps used to carry out the functions denoted at the blocks 628 and 636. After the pointer has been changed, the routine uses the pointer to read the appropriate color corrections from the computer 42, as shown at 646. These retrieved color corrections are then applied to the uncorrected video signals from the video signal source 44, as indicated at 648, to produce color corrected video signals, which are displayed on the main monitor 50. Additionally, the routine displays the video picture associated with the button in the array 34 that was pressed to enter the "read" mode over the entire area of the auxiliary monitor 52, as illustrated at 650. In other words, the auxiliary monitor 52 shows the selected video picture on an enlarged scale, i.e., on a scale like that of the main monitor 50.

If neither the "A" button nor the "B" button or the "picture file" button has been pressed during the "read" mode, the routine inquires whether the equipment is in the "next to" mode, as indicated at 652. The "next to" mode is entered by once pressing the "next to" button. If so, the routine again checks which of several split screen options has been selected by the operator and then uses the appropriate split screen option to divide or redivide the display on the auxiliary monitor 52. This step is designated at 620.

The "next to" button as described above in connection with the flowchart of FIG. 5B permits the operator to compare two full-size video pictures simultaneously on the auxiliary monitor. This is accomplished with a split screen. One video picture was previously stored and is now being recalled, while the other video picture is identical to the video picture on the main monitor. However, the video signals used to produce the latter video picture are subjected to essentially the same type of signal processing as the video signals used to produce the former video picture. In other words, the video signals producing the picture on the main monitor are initially converted into digital signals and subsequently converted back to analog signals. This signal processing technique results in pictures on the auxiliary monitor that are affected in the same way by the digitizing process. Thus, the operator is better able to observe the effects of certain color corrections on the present scene as compared to the prior scene. Furthermore, the use of two full-size video pictures permits the operator to better match the telecine position and/or size adjustments for the present scene with the prior scene.

The switching between the two video pictures on the auxiliary monitor may be accomplished while the signals are in their digital form. Consequently, differential distortions arising from conventional analog switching circuits, e.g., wiping circuits, are eliminated.

The video picture storage technique described above in connection with FIG. 5B, i.e., the technique in which specific memory locations in the computer 42 are allocated for color corrections associated with the miniature video pictures on the auxiliary display, may be thought of as "video scratch-pad memory." That is, the color corrections stored in the allocated memory locations are not necessarily related to color correction events. These color corrections may be accessed at random, with the miniature video pictures on the auxiliary display being useful to remind the operator of what these color corrections relate to. This feature permits the operator, on a random basis, to store and recall color corrections that were originally created on a temporary basis.

Although particular illustrative embodiments of the present invention have been described herein with reference to the accompanying drawings, the present invention is not limited to these particular embodiments. Various changes and modifications may be made thereto by those skilled in the art without departing from the spirit of scope of the invention, which is defined by the appended claims.

We claim:

1. A video signal color correction device, comprising, in combination, a video picture comparison device, said comparison device including means for conducting signals to display means for displaying two different pictures formed from two different video signals, video signal processing means for converting video signals into a form suitable for storage, means for conducting both of said video signals to said video signal processing means, storage means, means for storing one of said video signals in said storage means after processing by said signal processing means, readout means for reading said one signal out of said storage means and delivering it to said display means, and means for conducting the other video signal from said signal processing means to said display means, thereby avoiding differential degradation of said two different video signals; and color correction means for correcting the color of at least said other signal.

2. A device as in claim 1, in which said video signals originally are in analog form, and said signal processing means is adapted to convert said analog signals to digital form.

3. A device as in claim 1, in which said video signals originally are in analog form, said signal processing means is adapted to convert said analog signals to digital form, said storage means is a digital video picture storage device, said display means comprises at least one monitor using analog input signals, and including digital-to-analog converter means for converting said digital signals into analog signals for display.

4. A device as in claim 1, in which said video signals are produced sequentially from an analog storage medium, and said other signal represents the picture currently being read out of said analog storage medium, while said one signal represents a picture previously read out of said analog storage medium.

5. A device as in claim 1, in which said display means is adapted to display said one signal and said other signal adjacent one another simultaneously on a single screen.

6. A device as in claim 1, in which said color correction means is selected from the group consisting of: color balancing means; means for the individual vector control of hue and saturation; means for the individual vector control of luminance; and a combination of color balancing means with either or both of the latter two means.

7. A device as in claim 1, including means for storing and reading out identification signals for different frames of said video pictures, means for storing and reading out correction signals for correcting the color of different frame so said video pictures, recording means for recording color-corrected video signals on an output storage medium, and control means responsive to said identification signals for recording color-corrected video picture signals on said output storage medium.

8. A device as in claim 1 including video display means for displaying simultaneously on a single screen a plurality of video pictures corresponding to signals representing pictures stored in said storage means.

9. Apparatus for facilitating color comparison of a plurality of video pictures, comprising:
digital random-access video memory means for storing and recalling signals representative of said plurality of video pictures, including the current picture in a sequence;
control means for controlling said video memory means for selectively storing signals representative of selected ones of said video pictures and for selectively recalling the stored signals;
display means, responsive to said control means, for displaying a first video picture corresponding to said current video picture and for displaying a second video picture corresponding to the recalled signals representative of another video picture, whereby said first video picture, corresponding to said current video picture, and second video picture, corresponding to said other video picture, are readily comparable; and color correction means for selectively generating color correction signals for said plurality of video pictures, wherein said video memory means is responsive to said color correction means and stores signals representative of a plurality of color-corrected video pictures.

10. A method for color-comparing a plurality of video pictures corresponding to signals produced by a video signal source, comprising the steps of:

storing in a digital random-access memory signals representative of a video picture currently produced by said video signal source;

recalling the stored signals representative of said current video picture;

selectively storing in said digital memory signals representative of another video picture produced by said video signal source;

selectively recalling the stored signals representative of said other video picture;

displaying first and second video pictures on a monitor, said first video picture corresponding to the recalled signals representative of said current video picture, said second video picture corresponding to the recalled signals representative of said other video picture; and selectively color correcting the signals produced by said video signal source, and the step of storing color-corrected signals representative of color-corrected video pictures.

11. A color correction system for color correcting video picture signals representative of images stored in an image recording medium, comprising:

color correction means for selectively generating color correction signals for at least one selected image of each of a plurality of scenes recorded on said image recording medium;

video storage means for storing signals corresponding to a plurality of images, said video storage means being responsive to said color correction means and being adapted to store color-corrected signals;

control means for selectively storing signals representative of a desired image in said video storage means and for selectively retrieving the stored signals representative of said desired image from said video storage means, said control means including means for automatically storing signals representative of a currently produced image from said image recording medium and for automatically retrieving the stored signals representative of said currently produced image; and display means, responsive to said video storage means, for displaying a plurality of video pictures, wherein one of said displayed video pictures is formed from the retrieved signals representative of said currently produced image and another of said displayed video pictures is formed from the retrieved signals representative of said desired image.

12. A system as recited in claim 11, wherein said video picture signals are analog picture signals and said video storage means includes a digital storage device, wherein the system further comprises first signal conversion means for converting said analog picture signals into digital picture signals, and wherein said first signal conversion means is connected to said video storage means and delivers said digital picture signals to said video storage means.

13. A system as recited in claim 12, wherein said display means displays video pictures produced by analog picture signals, wherein the system further comprises second signal conversion means for converting digital picture signals into analog picture signals, wherein said second signal conversion means is connected to said video storage means and receives digital picture signals from said video storage means, and wherein said second signal conversion means is also connected to said display means and delivers analog picture signals to said display means.

14. A system as in claim 11 including further display means for displaying simultaneously on a single screen a plurality of video pictures corresponding to signals representing pictures stored in said storage means.

15. A method for color correcting video picture signals representative of images stored in an image recording medium, comprising the steps of:

producing video picture signals representative of each of the images stored in the image recording medium;

selectively generating color correction signals for at least one selected image of each of a plurality of scenes recorded on said image recording medium;

selectively storing signals representative of a desired image in a digital random-access video storage device;

selectively retrieving the stored signals representative of said desired image from said video storage device;

automatically storing signals representative of the current image within said image recording medium in said video storage device;

automatically retrieving the stored signals representative of said current image from said video storage device; and displaying on a monitor one video picture formed from the retrieved signals representative of said current image and another video picture formed from the retrieved signals representative of said desired image.

16. Apparatus for facilitating comparison of one video picture with another video picture selected from a plurality of other previously-stored video pictures, said apparatus comprising, in combination, first input terminal means for receiving signals representing said one video picture;

digital random access video picture signal storage means;

second input terminal means for receiving and storing in said storage means digital signals representative of said other video pictures;

retrieval means for randomly retrieving from said storage means signals representative of a selected one of said other pictures;

display means for displaying video pictures;

signal processing means for processing video signals into a form suitable for display on said display means;

means for conducting the signals representative of both said one picture and said selected other picture through said signal processing means to said display means; and control means for causing the display of said one picture and said selected other picture adjacent one another on said display means, whereby said one picture and said selected other picture can be easily compared without differential degradation of the pictures.

17. Apparatus as in claim 16 in which said display means is responsive to analog signals, said signals representing said one video picture are in digital form, and said signal processing means comprises digital-to-analog conversion means.

18. Apparatus as in claim 16 in which said display means includes means for displaying at least a portion of each of said one video picture and said selected other picture in substantially unreduced size in slit-screen form, and including means for color correcting said one video picture to match the color of said selected other picture.

19. Apparatus as in claim 16 in which said one video picture is part of a moving video picture program sequence, and said display means comprises a monitor for displaying said program sequence, and including means for selectively delivering the signals representing said one video picture to said second terminal means for storage in said storage means, whereby later pictures in said sequence can be compared with said one picture upon its retrieval from storage.

20. Apparatus as in claim 19 including a reproduction device for reproducing said video program signal sequences from an elongated serial program picture record, said one video picture being selected from among the pictures in said program sequence, whereby said one picture and picture being reproduced currently can be viewed without running said reproduction device back to reach the location of said one picture on said picture record.

21. Apparatus as in claim 16 in which said display means comprises a monitor and polypicture display means for displaying miniature representations of the pictures stored in said storage means, whereby said polypicture display can be used to help select a desired one of said stored pictures for display next to said one picture.

22. Apparatus as in claim 21 in which said polypicture display means is selected from the group consisting of: (a) means for displaying said miniature representations on the screen of said monitor; and (b) an auxiliary monitor with means for displaying said miniature representations on the screen thereof.

23. Apparatus as in claim 16 in which said one video picture is selected from a sequence of analog video moving picture signals, said display means being responsive to analog video signals for displaying video pictures;
said signal processing means including: analog-to-digital conversion means connected to said first input terminal means to receive and convert said analog video signals into digital video signals and digital-to-analog conversion means for converting the digital signals retrieved from said storage means and the output from said analog-to-digital conversion means into analog signals, and for delivering the resulting analog signals to said display means for display.

24. Apparatus as in claim 23 in which the source of said video moving picture signals is a device for producing video picture signals from an elongated image record medium, and including means for conducting to said second input terminal means and storing in said storage means signals representing selected previously displayed pictures from said sequence, whereby each of said previously displayed pictures can be re-viewed without running said device back to the location of said picture on said image record medium.

25. A method of displaying video pictures to facilitate comparison with one another, said method comprising the steps of:

storing a plurality of pictures in digital signal form in a random-access digital video picture storage device, randomly retrieving from said storage device the signals for a selected one of the stored pictures, presenting, from a separate source, video picture signals representing another video picture, processing both the signals for the selected stored picture and the video picture signals for said other picture in the same way to prepare said signals for delivery in proper form to operate video display means, and utilizing the processed signals for displaying said selected stored picture and said other picture near one another to facilitate comparison of said pictures with one another without differential degradation.

26. A method as in claim 25 in which the pictures being compared are displayed on a single screen in an array selected from the group consisting of (a) a split-screen display of at least a portion of both pictures in substantially full size, and (b) a polypicture display including a display of said plurality of stored pictures, in a size less than full size, and including the step of color correcting at least said other picture to match it to the color of said selected one of the stored pictures.

27. A method as in Claim 25 in which said storing step includes the step of storing signals representing selected frames from a moving video picture program, and retrieving and displaying said selected frames at a later time for comparison with the ten current frame, and matching the color of the then current frame with that of the selected prior frame.

28. A method as in claim 26, including using said polypicture display in selecting the one of said stored pictures to be retrieved.

* * * * *